(12) United States Patent
Luepke et al.

(10) Patent No.: US 9,676,126 B2
(45) Date of Patent: Jun. 13, 2017

(54) OPEN-FACE MOLDING

(71) Applicant: Lockheed Martin Corporation, Bethesda, MD (US)

(72) Inventors: Rick A. Luepke, Fort Worth, TX (US); Matthew A. Sodergren, Benbrook, TX (US); Matt McKee, Willow Park, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 585 days.

(21) Appl. No.: 14/107,567

(22) Filed: Dec. 16, 2013

(65) Prior Publication Data

US 2015/0367550 A1 Dec. 24, 2015

(51) Int. Cl.

| | |
|---|---|
| *B29C 45/80* | (2006.01) |
| *B29C 45/14* | (2006.01) |
| *B29C 45/26* | (2006.01) |
| *B29C 41/52* | (2006.01) |
| *B29C 41/36* | (2006.01) |
| *B29C 45/37* | (2006.01) |
| *B64F 5/10* | (2017.01) |
| *B29L 31/30* | (2006.01) |

(52) U.S. Cl.
CPC ............. *B29C 41/52* (2013.01); *B29C 41/36* (2013.01); *B29C 45/376* (2013.01); *B64F 5/10* (2017.01); *B29C 2945/76096* (2013.01); *B29C 2945/76264* (2013.01); *B29C 2945/76581* (2013.01); *B29C 2945/76742* (2013.01); *B29L 2031/3082* (2013.01)

(58) Field of Classification Search
CPC ......... B29C 45/26; B29C 45/80; B29C 41/52; B29C 45/376; B29C 41/36; B29C 2945/76096; B29C 2945/76264; B29C 2945/76581; B29C 2945/76742; B64C 1/12

See application file for complete search history.

(56) References Cited

U.S. PATENT DOCUMENTS

| | | | |
|---|---|---|---|
| 1,198,469 A | | 9/1916 | Merillat |
| 3,136,001 A | * | 6/1964 | Gelbard ................ B29C 45/376 249/142 |
| 3,780,976 A | | 12/1973 | Messier |
| (Continued) | | | |

FOREIGN PATENT DOCUMENTS

DE 102005014802 A1 * 12/2006 ............. B29C 45/04

*Primary Examiner* — Alison L Hindenlang
*Assistant Examiner* — Emmanuel S Luk
(74) *Attorney, Agent, or Firm* — Reising Ethington P.C.

(57) ABSTRACT

An open-face molding apparatus for use in open-face injection molding operations to more accurately control the thickness of coatings applied to workpiece surfaces of slightly varying contour profiles. A conformable tool face is carried by a rigid tool backing and a perimeter seal releasably seals the conformable tool face around its perimeter to the workpiece surface. The conformable tool face and perimeter seal define a mold cavity together with the workpiece surface. An array of actuators are connected between the rigid tool backing and the conformable tool face to provide a desired tool face contour and desired spacings between the conformable tool face and a workpiece surface by deflecting the conformable tool face relative to the rigid tool backing.

10 Claims, 5 Drawing Sheets

(56) References Cited

U.S. PATENT DOCUMENTS

| | | | |
|---|---|---|---|
| 4,047,692 A * | 9/1977 | Swin, Sr. | B29C 45/376 249/142 |
| 4,633,632 A * | 1/1987 | Sarh | B21J 15/142 52/245 |
| 5,849,056 A * | 12/1998 | May | C03B 23/0305 264/313 |
| 6,558,590 B1 * | 5/2003 | Stewart | B29C 43/183 264/134 |
| 6,589,038 B1 * | 7/2003 | Robinson | B29C 39/14 118/413 |
| 8,591,792 B2 * | 11/2013 | Mizuno | B29C 45/036 264/267 |
| 2003/0132551 A1 * | 7/2003 | Brown | B29C 45/0046 264/328.12 |
| 2003/0227107 A1 * | 12/2003 | Stewart | B29C 43/183 264/236 |
| 2003/0230821 A1 * | 12/2003 | Okado | B29C 43/58 264/40.5 |
| 2004/0081722 A1 * | 4/2004 | Dantlgraber | B29C 45/4005 425/589 |
| 2004/0101586 A1 * | 5/2004 | Kamiya | B29C 45/14434 425/122 |
| 2004/0115303 A1 * | 6/2004 | Burgess | B29C 33/0011 425/543 |
| 2004/0142057 A1 * | 7/2004 | Kao | B29C 45/561 425/149 |
| 2004/0217502 A1 * | 11/2004 | Klotz | B29C 45/0025 264/40.5 |
| 2005/0046075 A1 * | 3/2005 | Youngs | B29C 45/1635 264/255 |
| 2005/0264756 A1 * | 12/2005 | Esch | B29D 11/00134 351/159.74 |
| 2007/0031532 A1 * | 2/2007 | Chen | B29C 33/306 425/555 |
| 2007/0108657 A1 * | 5/2007 | Ferguson | B29C 45/14065 264/272.11 |
| 2007/0243277 A1 * | 10/2007 | Tsai | B29C 33/308 425/193 |
| 2012/0273985 A1 | 11/2012 | Luepke et al. | |
| 2014/0242211 A1 * | 8/2014 | Kim | B29C 45/2673 425/556 |
| 2016/0031491 A1 * | 2/2016 | Ikeno | B29C 45/0025 296/191 |

* cited by examiner

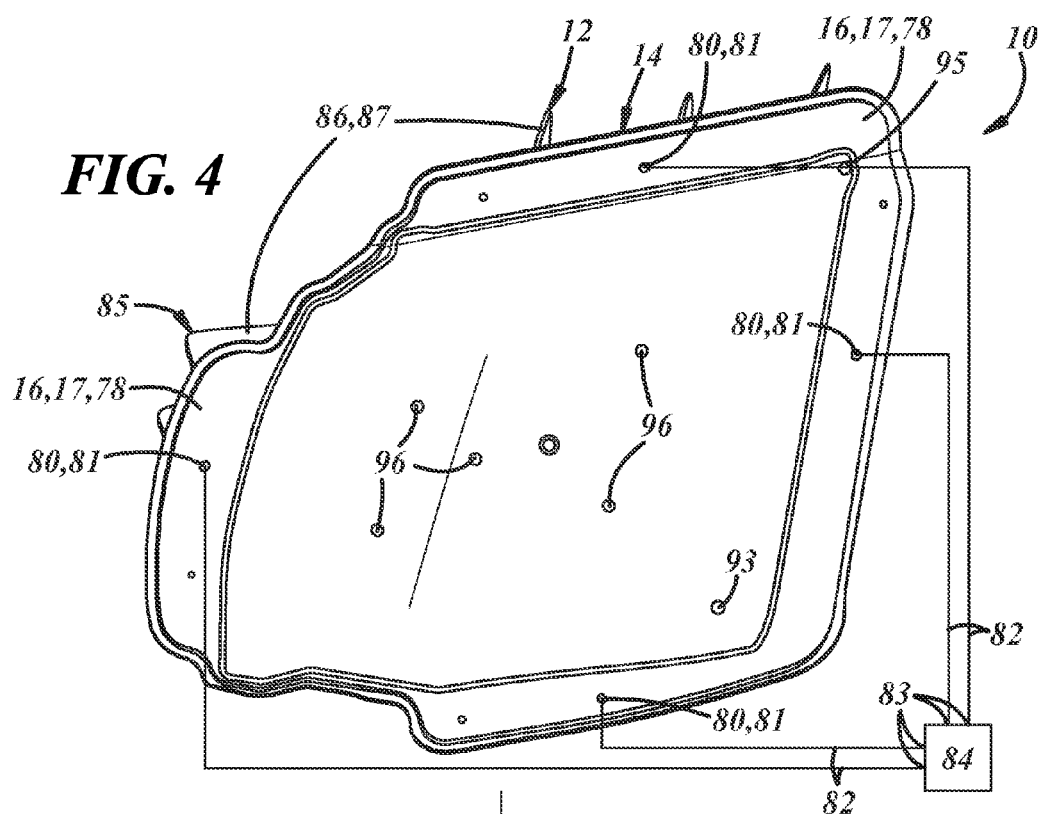
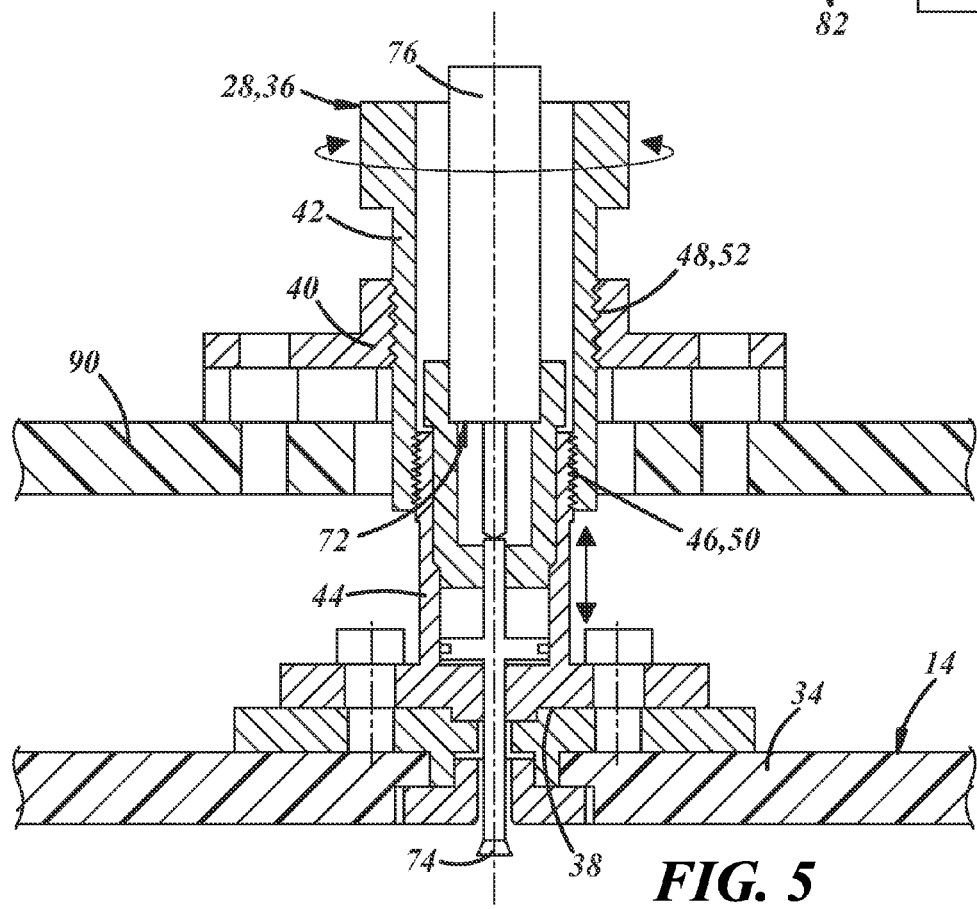

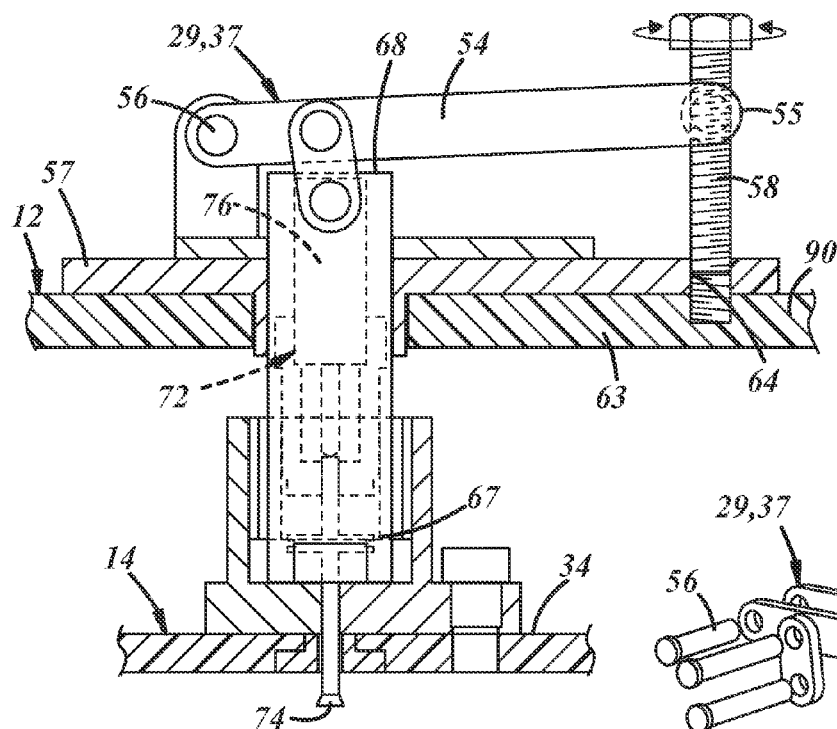
FIG. 6
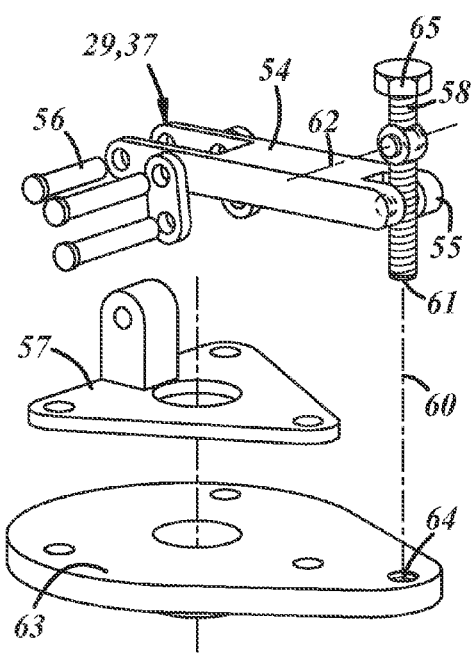
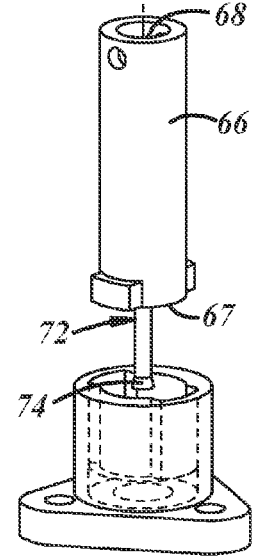
FIG. 7

OPEN-FACE MOLDING

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

Field

This application relates generally to an open-face injection molding operation for applying coatings to a series of workpiece surfaces having slightly different contour profiles.

Description of Related Art Including Information Disclosed Under 37 CFR 1.97 and 1.98

It is known to add a thin coating of low-observable material to an aircraft's skin to reduce the radar cross-section of the aircraft. It is desirable for such a coating to be of uniform thickness. Minute differences in skin contours between aircraft (in other words, deviations from engineering nominal values) make it difficult to apply layers of uniform thickness using known molding techniques. Consequently, low-observable material is often sprayed onto aircraft skin surfaces in several stages in a time-consuming process.

SUMMARY

An open-face injection molding apparatus is provided for applying coatings of uniform thickness to workpiece surfaces of slightly varying contour profiles. The apparatus comprises a rigid tool backing, a conformable tool face, and an array of actuators connected between the rigid tool backing and the conformable tool face. The conformable tool face is carried by the rigid tool backing and comprises a perimeter seal configured to seal the conformable tool face around its perimeter to the workpiece surface. The conformable tool face and perimeter seal are configured to define a mold cavity together with the workpiece surface, and the actuators are configured to deflect corresponding portions of the conformable tool face relative to the rigid tool backing to provide a desired tool face contour and desired spacings between the conformable tool face and a workpiece surface.

A method is provided for controlling the thickness of coatings applied to workpiece surfaces of slightly varying contour profiles. According to the method, a mold cavity is formed against a workpiece surface by sealing a perimeter of an open-face injection molding apparatus to the workpiece surface. Mold cavity gap distances are measured between a conformable tool face of the molding apparatus and the workpiece surface at distributed locations across the mold cavity. A desired tool face contour may be provided by adjusting the mold cavity gap distances from their measured values to predetermined desired values by deflecting the conformable tool face relative to the rigid tool backing at each of the distributed locations. Uncured moldable material is injected into the mold cavity, and the open-face injection molding apparatus is removed from the workpiece surface.

DRAWING DESCRIPTIONS

These and other features and advantages will become apparent to those skilled in the art in connection with the following detailed description and drawings of one or more embodiments of the invention, in which:

FIG. 4 is a front perspective view of the apparatus of FIG. 1;

FIG. 5 is a partial cross-sectional view of a first actuator embodiment mounted between the conformable tool face and rigid tool backing of the apparatus, and with a gap sensor shown housed within the actuator;

FIG. 6 is a full cross-sectional view of a second actuator embodiment mounted between the conformable tool face and rigid tool backing, and with the gap sensor shown housed within the actuator; and FIG. 7 is an exploded view of the second actuator embodiment.

DETAILED DESCRIPTION

Figure 1:
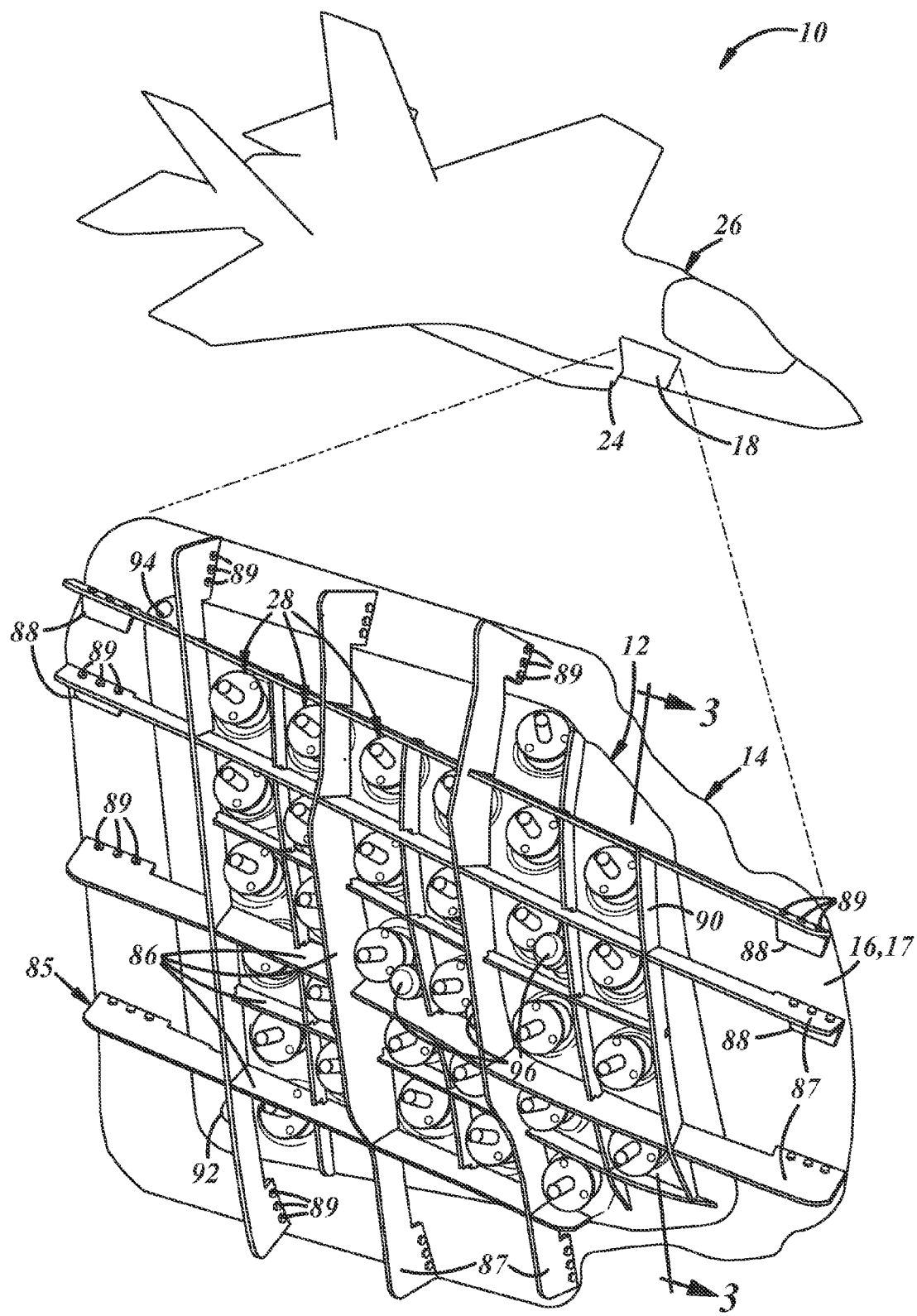
FIG. 1 is magnified back perspective view of a preferred embodiment of an open face mold apparatus shown supported on an F-35 aircraft over a compression bump adjacent an inlet duct area of the aircraft.

An open-face injection molding apparatus for use in applying coatings of uniform thickness to workpiece surfaces of slightly varying contour profiles, e.g., to more accurately control the thickness of low-observable performance coating material applied onto the compression bump adjacent the inlet duct area on an F-35 aircraft, is generally shown at 10 in FIGS. 1-4. The apparatus 10 may include a rigid tool backing 12 and a conformable tool face 14 carried by the rigid tool backing 12. The apparatus may include a perimeter seal 16 configured to seal the conformable tool face 14 around its perimeter to a workpiece surface 18. The conformable tool face 14 and perimeter seal 16 may be configured to define a mold cavity 20 together with the workpiece surface 18. In other words, the rigid tool backing 12, tool face 14, and perimeter seal 16 may be shaped to conform to contours of the workpiece surface 18, e.g., an F-35 aircraft skin surface area surrounding a compression bump 22 adjacent an inlet duct area 24 of an aircraft 26. An array of linear actuators 28 may be connected between the rigid tool backing 12 and the conformable tool face 14. The linear actuators 28 may be configured to deflect corresponding portions of the conformable tool face 14 relative to the rigid tool backing 12 to provide a desired tool face 14 contour and desired spacings between the conformable tool face 14 and a workpiece surface 18.

The conformable tool face 14 may comprise any material or materials and any configuration or arrangement of elements suitable to allow for deflection of the conformable tool face 14 by mechanical means while resisting deflections caused by performance material injection pressures. The tool face 14 may comprise a geodesic array of semi-rigid triangular plates 30 joined by live hinges 32. The live hinges 32 may be created by selectively removing material from the back of the conformable tool face 14 to reduce stiffness in the tool face 14. This allows the tool face material to deform, or hinge, along the live hinges 32 defining the triangular plates 30. Wherever six of the hinges 32 intersect, the conformable tool face 14 may include engagement bosses 34 configured to receive the linear actuators 28.

Figure 3:
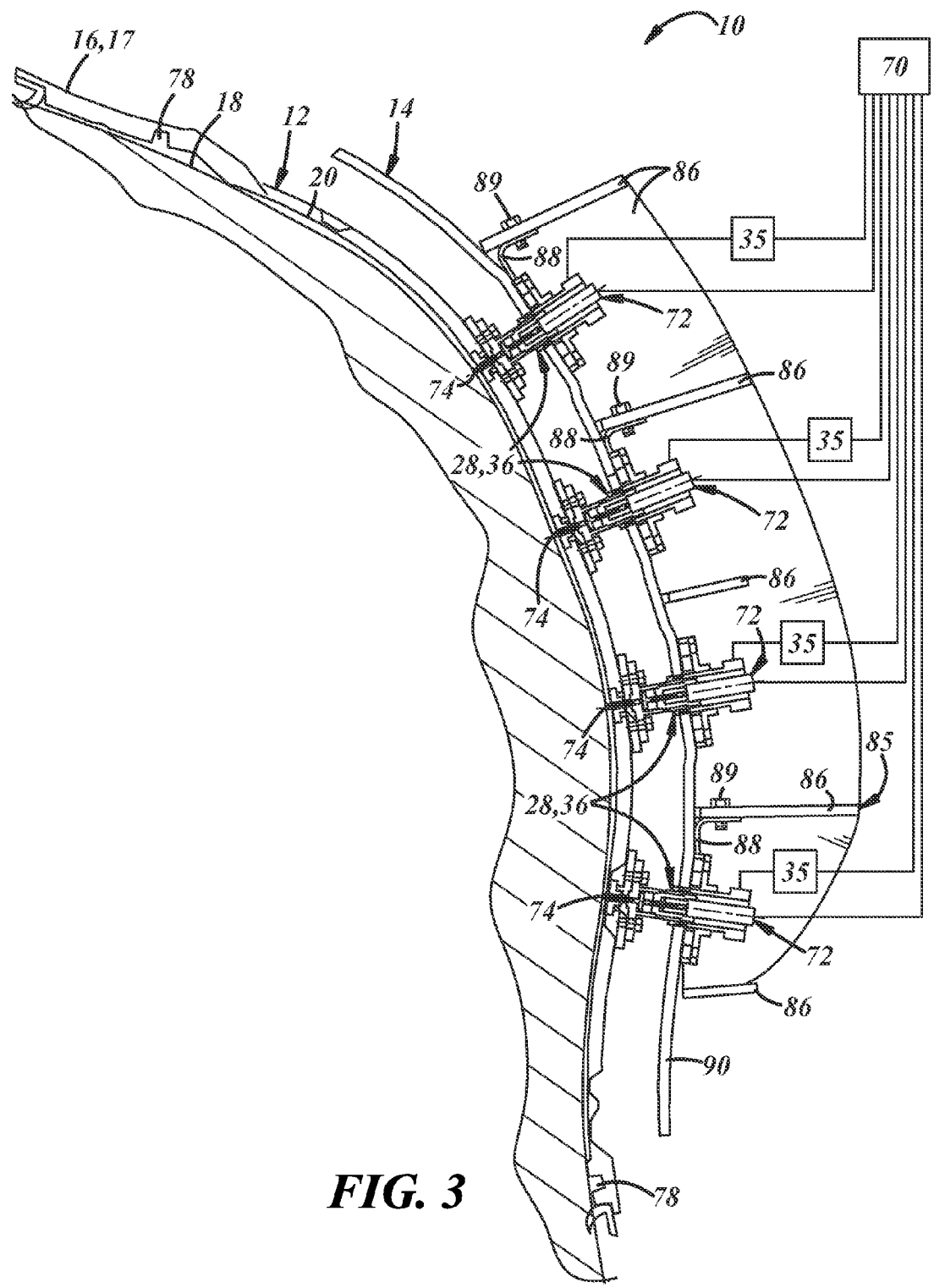
FIG. 3 is a cross-sectional view of the apparatus of FIG. 1 placed against the aircraft over the compression bump of the aircraft.

Each actuator 28 may comprise a force multiplier 36 configured to provide an output displacement rate at an output end 38 of the actuator 28 (connected to the conformable tool face 14), that is less than what the output displacement rate would be for a given input displacement rate, without the force multiplier 36 being present. As shown in FIG. 3, the apparatus may also include drivers 35. Each driver 35 may be drivingly connected to a respective force multiplier 36 and configured to actuate the linear actuators 28 to provide desired spacings between the conformable tool face 14 and a workpiece surface 18

As shown in FIG. 5, the force multiplier 36 may comprise a threaded back shell mounting plate 40, a main threaded adjustment shaft 42, and a secondary threaded adjustment shaft 44. The main threaded adjustment shaft 42 includes inner and outer threads 46, 48. The inner main threaded adjustment shaft threads 46 have a shallower pitch than the outer main threaded adjustment shaft threads 48, but both sets spiral about a center of rotation with the same handedness. The inner main threaded adjustment shaft threads 46 engage threads 50 of the secondary threaded adjustment shaft 44. The outer main threaded adjustment shaft threads 48 engage threads 52 of the threaded back shell mounting plate 40. The threaded back shell mounting plate 40 is fixed to the rigid tool backing 12, and the secondary threaded adjustment shaft 44 is fixed to the conformal tool face 14 such that only the main threaded adjustment shaft 42 may rotate.

The main shaft/mounting plate 48, 52 and main shaft/secondary shaft 46, 50 thread sets convert rotational motion applied to the main threaded adjustment shaft 42 into linear motion of the main threaded adjustment shaft 42 and secondary threaded adjustment shaft 44 relative to the threaded back shell mounting plate 40. Since both thread sets spiral in the same sense, rotating the main threaded adjustment shaft 42 such that it moves toward the conformal tool face 14 both pushes the secondary threaded adjustment shaft 44 away from the rigid tool backing 12 via linear motion of the main threaded adjustment shaft 42, and retracts the secondary threaded adjustment shaft 44 into the main threaded adjustment shaft 42 due to the rotational motion of the main threaded adjustment shaft 42. Since the main shaft/mounting plate thread set 48, 52 has a steeper pitch than the main shaft/secondary shaft thread set 46, 50, the output displacement of the secondary adjustment shaft 44 is effectively geared down to increase linear force imparted at the expense of linear displacement for a given amount of rotational force and displacement input to the main adjustment shaft 42.

FIGS. 6-7 show an alternative actuator 29 comprising a force multiplier lever 37. The force multiplier lever 37 may preferably include a lever arm 54 supported for pivotal reciprocal motion about a fulcrum pin 56 carried by a fulcrum pin support plate 57 that is carried by a an actuator mounting plate 63, that is, in turn, carried by the rigid tool backing 12. Fasteners (not shown) extend through holes in the fulcrum pin support plate 63 and the actuator mounting plate 63 and hold the plates 56, 63 to the rigid tool backing 12 by threadedly engaging the rigid tool backing 12. A threaded pin 58 may be supported adjacent a distal end 55 of the lever arm 54 at an outer end 59 for rotational motion about a longitudinal rotational axis 60 of the threaded pin 58, and for pivotal motion about a first pivot axis 62 disposed transverse to the rotational axis 60 of the threaded pin 58. The threaded pin 58 may be threadedly engaged at an inner end 61 to threaded apertures 64 in the actuator mounting plate 63 and/or the rigid tool backing 12 and may include a torque feature 65 spaced axially outward from the inner end 61 of the pin 58 for applying torque to turn the threaded pin 58 relative to the lever arm 54 and the threaded aperture 64.

As shown in FIGS. 6-7, the alternative actuator 29 may further include a push-pull member 66 extending through the rigid tool backing 12, connected at an inner end 67 to the conformable tool face 14, and pivotally connected at an outer end 68 to the lever arm 54 between the fulcrum 56 and the threaded pin 58. Thus, torque applied to thread the threaded pin 58 into the threaded aperture 64 will pull the distal end of the lever arm 54 inward, pushing the conformable tool face 14 inward toward the workpiece surface 18 and away from the rigid tool backing 12. Torque application to unthread the threaded pin 58 from the threaded aperture 64 will push the distal end 55 of the lever arm 54 outward, pulling the conformable tool face 14 outward and away from the workpiece surface 18 and toward the rigid tool backing 12. The force multiplier lever 37 thus provides an output displacement rate at the output end 39 of the alternative actuator 29 (located on the push-pull member), that is less than an output displacement rate that would be provided by a given input displacement rate without the force multiplier lever 37 effect.

As shown in FIG. 3, the apparatus 10 may include a controller 70 coupled with each actuator 28. The controller 70 may be configured to command the actuators 28 to provide desired respective mold cavity gap distances in each actuator 28 location by moving the conformable tool face 14 relative to the workpiece surface 18 in each actuator 28 location so that desired respective material coating thicknesses can be provided across the workpiece surface 18. The controller 70 may thus be configured to command the actuators 28 to provide a single desired mold cavity gap distance in all actuator 28 locations. The controller 70 may therefore ensure that a uniform material coating thickness can be provided across the material coating application area.

As shown in FIG. 3, a plurality of gap sensors 72 may be connected to the controller 70 and distributed across the conformable tool face 14. The gap sensors 72 are configured to measure respective local mold cavity gap distances between the conformable tool face 14 and the workpiece surface 18. In a preferred embodiment, the gap sensors 72 may be contact-type Linear Variable Displacement Transducers (LVDTs). In other embodiments, however, the gap sensors 72 could be any suitable non-contact gap sensor such as, for example, an inductive or capacitive sensor.

As shown in FIG. 3, the controller 70 may also be connected to each driver 35 and configured to command the drivers 35 to actuate the actuators 28 in such a way as to deflect corresponding portions of the conformable tool face 14 relative to the rigid tool backing 12 to provide a desired tool face 14 contour and desired spacings between the conformable tool face 14 and a workpiece surface 18. The controllers may be configured to use feedback data from the gap sensors 72 to more accurately command the actuators 28 to provide desired spacings.

As best shown in FIGS. 5-7 each gap sensor 72 may be carried by one of the actuators 28, and may include a sensor foot 74 that is retractably extendable from a main gap sensor body 76 through the conformable tool face 14 to contact the workpiece surface 18 when commanded to do so by the controller 70. Each gap sensor 72 may be configured to generate a signal corresponding to the sensed cavity gap distance and to transmit that signal to the controller 70. Following gap distance measurement, the controller 70 may command each gap sensor 72 to retract its sensor foot 74 to a position flush with the conformable tool face 14 in preparation for coating material injection. The controller 70 may thus use the signals generated by the gap sensors 72 to command the actuators 28 to conform the tool face 14 to a desired contour relative to a contour of the workpiece surface 18, forming the tool face 14 to a contour profile that is offset from and complementary to the profile of the workpiece surface 18.

As best shown in FIG. 4, the perimeter seal 16 may include a vacuum bay 78, vacuum ports 80 extending through the perimeter seal 16 and opening into the perimeter vacuum bay 78, and vacuum paths (or lines) 82. Each vacuum path 82 may be connected to the vacuum port 80 at a first end 81, and may comprise a second end 83 configured to connect to a vacuum source 84 such that a vacuum may be drawn on the vacuum bay 78 to support the apparatus 10 on the workpiece surface 18 and close the mold cavity 20.

Figure 2:
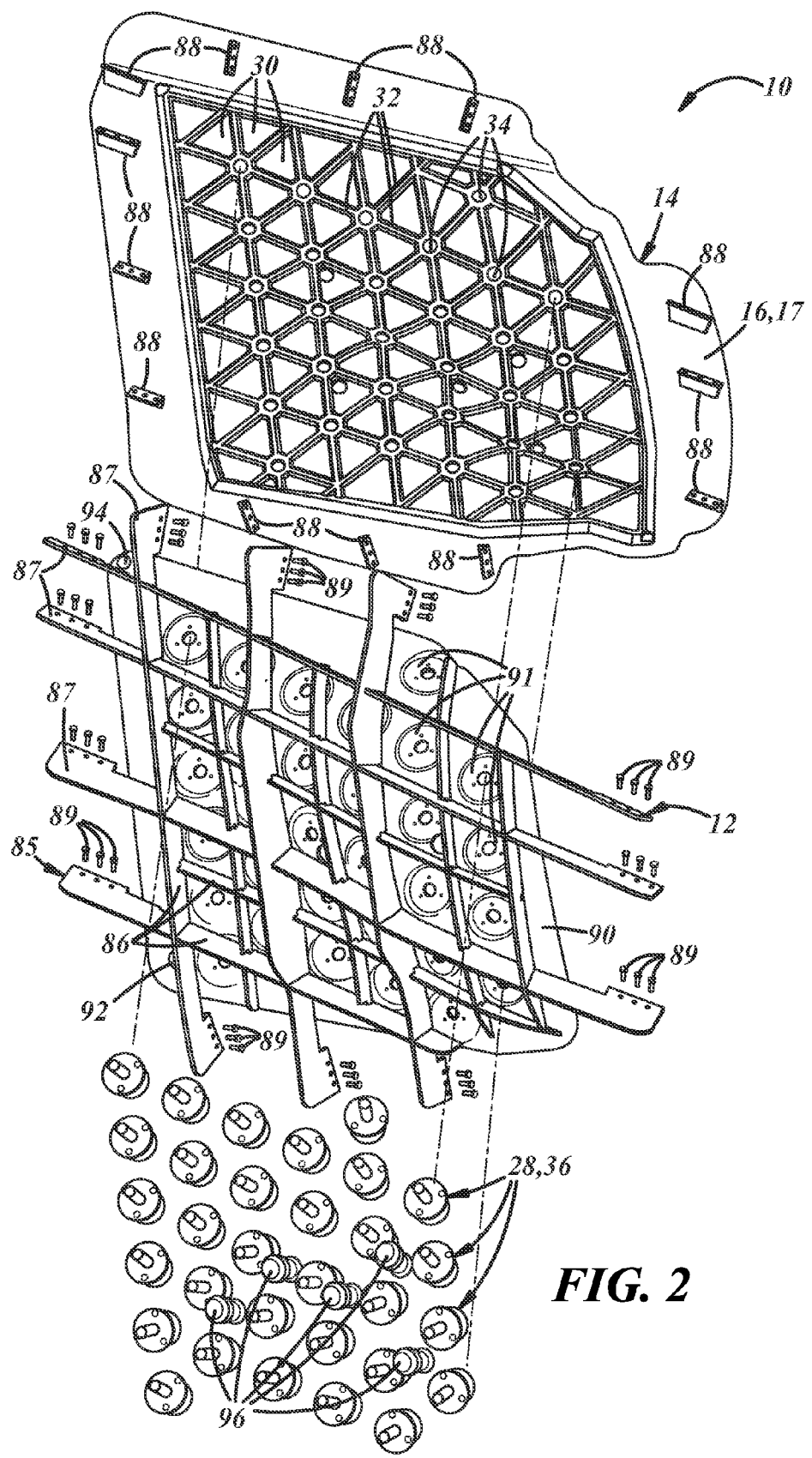
FIG. 2 is an exploded view of the apparatus of FIG. 1, showing a conformable tool face of the apparatus separated from a rigid tool backing of the apparatus, and an array of actuators, an injection port, and a bleed port of the apparatus.

The rigid tool backing 12 is configured to withstand the forces that must be applied by the actuators to mechanically deflect the conformable tool face 14 in addition to any forces imparted to the backing 12 by equipment used to position the apparatus 10 onto an aircraft surface 18 for injection. To this end, the rigid tool backing 12 may comprise any material suitable to resist deformation, and may include rigid rib panels 86 attached generally at right angles to one another to form a supporting framework 85 as best shown in FIGS. 1 and 2. Some of the rib panels 86 may extend laterally outward from the framework and may include, at their distal ends, perimeter braces 87 connected to a rigid backing portion 17 of the perimeter seal 16 surrounding the conformable tool face 14. The perimeter braces 87 may be connected to the perimeter seal 16 by fasteners 89 passed through L-brackets 88. The rigid tool backing 12 may also include an actuator support surface 90 carried by the supporting framework 85 and comprising flat, generally annular actuator mounting facets 91 configured to receive the actuators 28.

As best shown in FIGS. 2 and 4, the conformable tool face 14 may include a material injection port 93 extending through the conformable tool face 14, and the rigid tool backing 12 may include an injection port access hole 92 extending through the rigid tool backing 12. The injection port access hole 92 is configured to allow uncured material to be injected through the material injection port 93 in the conformable tool face 14, and into the mold cavity 20.

As shown in FIGS. 2 and 4, the conformable tool face 14 may include a bleed port 95 extending through the conformable tool face 14, and the rigid tool backing 12 may include a bleed port access hole 94 extending through the rigid tool backing 12. The bleed port 95 is configured to allow air to escape the mold cavity 20 when displaced by the injection of uncured material into the mold cavity 20. The conformal tool face 14 may also support air injector ports 96 configured to allow air to be injected through the conformable tool face 14 and into the mold cavity 20 to assist in removing the mold from the workpiece surface 18.

In practice, the apparatus 10 may be used to control the thickness of a coating applied to a workpiece surface 18 (such as an F-35 aircraft skin surface area surrounding a compression bump 22 adjacent an inlet duct area 24 of the aircraft 26) by first forming a mold cavity 20 against the workpiece surface 18 by sealing the perimeter of the open-face injection molding apparatus 10 to the workpiece surface 18. The mold cavity 20 may then be sealed around the apparatus 10 perimeter by drawing a vacuum in the vacuum bay 78 of the perimeter seal 16 surrounding the conformable tool face 14 of the molding apparatus 10, to support the apparatus 10 on the workpiece surface 18 and to close the mold cavity 20.

Mold cavity gap distances may then be measured between the conformable tool face 14 of the molding apparatus 10 and the workpiece surface 18 at distributed locations across the mold cavity 20 by actuating and obtaining cavity gap distance readings from the plurality of gap sensors 72 carried by the conformable tool face 14 at the distributed locations. Cavity gap distance readings may, for example, be obtained by actuating the linear variable displacement transducer gap sensors 72 to extend their respective sensor feet 74 into contact with respective adjacent workpiece surface 18 regions, then actuating the transducers 72 to retract their respective sensor feet 74 in advance of mold material injection. Conversely, mold cavity gap distances may be calibrated by measuring injected and cured material thickness. Material thickness measurements may then be examined to determine required adjustment of specific actuators 28 to bring the injectable material thickness into a specific thickness range. A desired tool face contour may then be provided by adjusting the mold cavity gap distances from their measured values to the same predetermined desired values by deflecting the conformable tool face 14 relative to the rigid tool backing 12 at each of the distributed locations. Where a uniform coating of moldable material is desired, the mold cavity gap distances may be adjusted from their measured values to a single common predetermined desired value by deflecting the conformable tool face 14 relative to the rigid tool backing 12 at each of the distributed locations by an equal amount. The gap distances adjustments may be accomplished by actuating the array of linear actuators 28 connected between the rigid tool backing 12 and the conformable tool face 14.

Uncured moldable coating material may then be injected into the mold cavity 20 through the material injection port 93 of the conformable tool face 14. Air displaced by the injected material may be expelled from the mold cavity 20 through the bleed port 95.

Finally, after the injected material has cured, the open-face injection molding apparatus 10 may be removed from the workpiece surface 18 by releasing the vacuum in the vacuum bay 78 of the perimeter seal 16 of the conformable tool face 14, and injecting air between the conformable tool face 14 and the molded material in the mold cavity 20 via the air injector ports 96.

Thus, the ability to maintain consistent coating thicknesses across each of a series of workpiece surfaces 18, despite small variations between the contours of the respective workpiece surfaces 18, can be achieved by using the apparatus 10 to define mold cavities of consistent thickness between the tool and each workpiece surface 18, into which moldable material can then be injected. In the case of the F-35 compression bump, this makes it possible to meet low-observable material thickness requirements across each injection site for workpiece surfaces 18 of varying profiles, providing consistent desired performance attributes between aircraft.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above. In other embodiments, any other suitable open-face injection molding apparatus components and methods may be used such as, for example, those disclosed in U.S. patent application Ser. No. 13/096,370 filed Apr. 28, 2011, which is incorporated herein by reference in its entirety.

What is claimed is:

1. An open-face molding apparatus for use in open-face injection molding operations to more accurately control the thickness of coatings applied to workpiece surfaces of slightly varying contour profiles; the apparatus comprising:
   a rigid tool backing;
   a conformable tool face carried by the rigid tool backing;
   a perimeter seal configured to seal the conformable tool face around its perimeter to a workpiece surface, the conformable tool face and perimeter seal being configured to define a mold cavity together with the workpiece surface; and
   an array of actuators connected between the rigid tool backing and the conformable tool face and configured to deflect corresponding portions of the conformable tool face relative to the rigid tool backing to provide a desired tool face contour and desired spacings between the conformable tool face and the workpiece surface.

2. An open-face molding apparatus as defined in claim 1 in which the apparatus includes a controller coupled with each actuator and configured to command the actuators to provide desired respective mold cavity gap distances in each actuator location by moving the conformable tool face relative to the workpiece surface in each actuator location.

3. An open-face molding apparatus as defined in claim 2 in which the controller is configured to command the actuators to provide a single desired mold cavity gap distance in all actuator locations.

4. An open-face molding apparatus as defined in claim 2 and further comprising a plurality of gap sensors connected to the controller and distributed across the conformable tool face and configured to measure respective local mold cavity gap distances between the conformable tool face and the workpiece surface.

5. An open-face molding apparatus as defined in claim 4 in which the gap sensors are linear variable displacement transducers.

6. An open-face molding apparatus as defined in claim 4 in which each gap sensor is carried by one of the actuators.

7. An open-face molding apparatus as defined in claim 1 in which the perimeter seal includes:
   a vacuum bay;
   a vacuum port extending through the perimeter seal and opening into the perimeter vacuum bay; and
   a vacuum path connected to the vacuum port at a first end and comprising a second end configured to connect to a vacuum source.

8. An open-face molding apparatus as defined in claim 1 in which:
   the conformable tool face includes a material injection port extending through the conformable tool face and configured to allow material to be injected through the conformable tool face into the mold cavity; and
   the rigid tool backing includes a material injection port access hole extending through the rigid tool backing and configured to allow uncured material to be injected through the material injection port and into the mold cavity.

9. An open-face molding apparatus as defined in claim 8 in which:
   the conformable tool face includes a bleed port extending through the conformable tool face and configured to allow air to escape the mold cavity when displaced by the injection of uncured material into the mold cavity; and
   the rigid tool backing includes a bleed port access hole extending through the rigid tool backing and configured to allow air to escape the bleed port as the air is displaced by uncured material being injected into the mold cavity through the material injection port.

10. An open-face molding apparatus as defined in claim 1 in which at least one actuator of the array of actuators comprises a force multiplier configured to provide an output displacement rate at an output end of the actuator connected to the conformable tool face, that is less than an output displacement rate that would be provided by a given input displacement rate without the force multiplier.

\* \* \* \* \*